(12) United States Patent
Bedin et al.

(10) Patent No.: US 11,962,379 B2
(45) Date of Patent: Apr. 16, 2024

(54) RECEIVER APPARATUS AND TRANSMITTER APPARATUS

(71) Applicant: Nokia Technologies Oy, Espoo (FI)

(72) Inventors: Andrea Bedin, Espoo (FI); Dani Johannes Korpi, Helsinki (FI); Karthik Upadhya, Espoo (FI); Mikko Aleksi Uusitalo, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/977,416

(22) Filed: Oct. 31, 2022

(65) Prior Publication Data

US 2023/0135015 A1 May 4, 2023

(30) Foreign Application Priority Data

Nov. 2, 2021 (EP) .................................... 21205971

(51) Int. Cl.
*H04B 7/06* (2006.01)
*H04B 7/08* (2006.01)

(52) U.S. Cl.
CPC ......... *H04B 7/0617* (2013.01); *H04B 7/0691* (2013.01); *H04B 7/0868* (2013.01)

(58) Field of Classification Search
CPC .. H04B 7/0617; H04B 7/0691; H04B 7/0868; H04B 1/40; H04B 7/0697; H04B 7/08; H04B 7/06; H04B 1/48
See application file for complete search history.

(56) References Cited

U.S. PATENT DOCUMENTS 6,559,797 B1 * 5/2003 Chang .................. H01Q 21/065
 342/368
10,050,680 B2 * 8/2018 Petrovic ............... H04B 7/0408
(Continued)

FOREIGN PATENT DOCUMENTS

EP 3 171 526 B1 3/2020
WO WO-2009002331 A1 * 12/2008 ........... H04B 7/0691
(Continued)

OTHER PUBLICATIONS

P. Gao and Y. Sanada, "Downlink Performance of MRT-BD in Multiuser Massive MIMO with Low Resolution ADCs," 2018 IEEE 5G World Forum (5GWF), 2018, pp. 55-59, doi: 10.1109/5GWF.2018.8517077.
(Continued)

*Primary Examiner* — Jean B Corrielus
(74) *Attorney, Agent, or Firm* — Lippes Mathias LLP (57) ABSTRACT

Examples of the disclosure relate to receiver apparatus and corresponding transmitter apparatus that can be configured in different operational states at different times. An example receiver apparatus comprises a plurality of downconverting means for downconverting separate antenna signals, one or more analog to digital converters, and one or more multiplexing means configurable in at least a first configuration and a second configuration. When the multiplexing means is configured in the first configuration the plurality of downconverting means and the one or more analog to digital converters are configured to enable separate antenna signals to be combined to provide hybrid beamforming or analog beamforming. The hybrid beamforming or analog beamforming can be provided across the bandwidth of the apparatus. When the multiplexing means is configured in the second configuration the plurality of downconverting means and the one or more analog to digital converters are configured to enable separate antenna signals to be used to (Continued)

enable digital beamforming. The digital beamforming can be provided across a sub-section of the bandwidth.

20 Claims, 7 Drawing Sheets

(56) References Cited

U.S. PATENT DOCUMENTS

| | | | |
|---|---|---|---|
| 11,695,454 B2* | 7/2023 | Balteanu | H04B 7/0848 375/267 |
| 2011/0299630 A1* | 12/2011 | Petrovic | H04B 7/0408 375/340 |
| 2012/0275498 A1* | 11/2012 | van Waasen | H04B 7/0693 375/219 |
| 2018/0241424 A1* | 8/2018 | Domino | H03F 3/72 |
| 2020/0007202 A1 | 1/2020 | Khan | |
| 2020/0212983 A1 | 7/2020 | Cha et al. | |
| 2021/0013940 A1 | 1/2021 | Lu et al. | |
| 2021/0067223 A1 | 3/2021 | Uchida | |

FOREIGN PATENT DOCUMENTS

| | | | |
|---|---|---|---|
| WO | WO-2014203249 A1 * | 12/2014 | H04B 7/08 |
| WO | WO 2017/092797 A1 | 6/2017 | |
| WO | WO 2018/071026 A1 | 4/2018 | |
| WO | WO 2021/167742 A1 | 8/2021 | |
| WO | WO 2023/033841 A1 | 3/2023 | |

OTHER PUBLICATIONS

T. Zhang, C. Wen, S. Jin and T. Jiang, "Mixed-ADC Massive MIMO Detectors: Performance Analysis and Design Optimization," IEEE Transactions on Wireless Communications, vol. 15, No. 11, pp. 7738-7752, Nov. 2016, doi: 10.1109/TWC.2016.2606592.

I. Ahmed, H. Khammari, A. Shahid, A. Musa, K. Kim, E. DePoorter, and I. Moerman, "A Survey on Hybrid Beamforming Techniques in 5G: Architecture and System Model Perspectives", IEEE Communications surveys & Tutorials, V. 20, N. 4, Fourth Quarter 2018, pp. 3060-3097.

A. Li and C. Masouros, "Energy-Efficient SWIPT: From Fully Digital to Hybrid Analog-Digital Beamforming", IEEE Transactions on Vehicular Technology, V. 67, N. 4, Apr. 2018, pp. 3390-3405.

H. Nosrati, E. Aboutanios, D. Smith, X. Wang, "Switch-Based Hybrid Precoding in mmWave Massive MIMO Systems", 2019 27th European Signal Processing Conference (EUSIPCO), 5 pgs.

* cited by examiner

RECEIVER APPARATUS AND TRANSMITTER APPARATUS

TECHNOLOGICAL FIELD

Examples of the disclosure relate to receiver apparatus and transmitter apparatus. Some relate to receiver apparatus and transmitter apparatus that can be used for Ultra Reliable Low-Latency Communications (URLLC) or other types of wireless communications.

The project leading to this application has received funding from the European Union's Horizon 2020 research and innovation programme under the Marie Sklodowska-Curie grant agreement No 861222.

BACKGROUND

Digital beamforming provides for reliable and robust communication compared to analog and low rank hybrid beamforming. However, digital beamforming requires a large number of expensive components such as analog to digital converters (ADCs) and digital to analog converters (DACs). The ADCs and DACs have a high-power consumption and produce a lot of raw data that needs to be processed.

BRIEF SUMMARY

According to various, but not necessarily all, examples of the disclosure there is provided a receiver apparatus comprising:
  a plurality of downconverting means for downconverting separate antenna signals;
  one or more analog to digital converters; and
  one or more multiplexing means configurable in at least a first configuration and a second configuration, wherein;
  when the multiplexing means is configured in the first configuration the plurality of downconverting means and the one or more analog to digital converters are configured to enable separate antenna signals to be combined to provide hybrid beamforming or analog beamforming and when the multiplexing means is configured in the second configuration the plurality of downconverting means and the one or more analog to digital converters are configured to enable separate antenna signals to be used to enable digital beamforming.

The hybrid beamforming or analog beamforming may be enabled across a bandwidth of the receiver apparatus and the digital beamforming may be enabled across a sub-section of the bandwidth.

The receiver apparatus may comprise one or more downconverting means for downconverting combined antenna signals.

The receiver apparatus may be configured so that when the multiplexing means is configured in the first configuration only downconverted combined antenna signals are provided to the one or more analog to digital converters and when the multiplexing means is configured in a second configuration at least a sub-set of the downconverted separate antenna signals are sampled and provided to the one or more analog to digital converters.

The receiver apparatus may comprise a plurality of analog to digital converters configured to convert the downconverted separate antenna signals such that when the multiplexing means is in the first configuration outputs of the plurality of analog to digital converters are combined to provide hybrid beamforming or analog beamforming and when the multiplexing means is in the second configuration the downconverted separate antenna signals are used to provide digital beamforming.

The multiplexing means may be configured to use time interleaving.

The multiplexing means may be configured to use frequency interleaving.

The one or more multiplexing means and the one or more analog to digital converters may be configured to enable the analog beamforming to be provided in parallel with the digital beamforming.

The one or more multiplexing means may be configured to enable a rank of the digital beamforming to be varied.

The multiplexing means may comprise one or more switches.

The multiplexing means may be configured to control a rank of digital beamforming by controlling the number of separate antenna signals that are sampled.

The downconverting means may comprise one or more mixers.

The receiver apparatus may comprise one or more multiplexers configured to multiplex separate antenna signals before they are provided to the plurality of downconverting means for downconverting separate antenna signals.

According to various, but not necessarily all, examples of the disclosure there may be provided a transmitter apparatus comprising:
  a plurality of upconverting means for upconverting separate signals for different antennas;
  one or more digital to analog converters; and
  one or more demultiplexing means configurable in at least a first configuration and a second configuration, wherein;
  when the demultiplexing means is configured in the first configuration the plurality of upconverting means and the one or more digital to analog converters are configured to enable antenna signals to be combined to provide hybrid beamforming or analog beamforming and when the demultiplexing means is configured in the second configuration the plurality of upconverting means and the one or more digital to analog converters are configured to enable separate antenna signals to be used to enable digital beamforming.

The hybrid beamforming or analog beamforming may be provided across a bandwidth of the transmitter apparatus and the digital beamforming is provided across a sub-section of the bandwidth.

The transmitter apparatus may comprise one or more upconverting means for upconverting signals for a plurality of antennas.

The demultiplexing means may be configured in the first configuration only the signals from the one or more digital to analog converters are provided to the plurality of upconverting means for upconverting signals for a plurality of antennas and when the demultiplexing means is configured in a second configuration at least a sub-sample of the signals from the one or more digital to analog converters are provided to the plurality of upconverting means for upconverting separate signals for different antennas.

The one or more demultiplexing means and the one or more analog to digital converters may be configured to enable the hybrid beamforming or analog beamforming to be provided in parallel with the digital beamforming.

The one or more demultiplexing means may be configured to enable a rank of the digital beamforming to be varied.

The demultiplexing means may comprise one or more switches The demultiplexing means may be configured to control a rank of digital beamforming by controlling the sampling rate of the signals provided to the demultiplexing means.

The upconverting means may comprise one or more mixers.

According to various, but not necessarily all, examples of the disclosure there may be provided an electronic device comprising at least one transmitter apparatus and/or at least one receiver apparatus as claimed in any preceding claim.

According to various, but not necessarily all, examples of the disclosure there may be provided a receiver apparatus comprising:
  one or more downconverting means for downconverting added antenna signals;
  a plurality of downconverting means for downconverting separate antenna signals;
  one or more analog to digital converters; and
  one or more multiplexing means configurable in at least a first configuration and a second configuration, wherein;
  when the multiplexing means is configured in the first configuration only downconverted added antenna signals are provided to the one or more analog to digital converters and when the multiplexing means is configured in a second configuration at least a sub-set of the downconverted separate antenna signals are sampled and provided to the one or more analog to digital converters.

According to various, but not necessarily all, examples of the disclosure there may be provided a transmitter apparatus comprising:
  one or more upconverting means for upconverting signals for a plurality of antennas;
  a plurality of upconverting means for upconverting separate signals for different antennas;
  one or more digital to analog converters; and
  one or more demultiplexing means configurable in at least a first configuration and a second configuration, wherein;
  when the demultiplexing means is configured in the first configuration only the signals from the one or more digital to analog converters are provided to the upconverting means for upconverting signals for a plurality of antennas and when the demultiplexing means is configured in a second configuration at least a sub-sample of the signals from the one or more digital to analog converters are provided to the one or more upconverting means for upconverting separate signals for different antennas.

According to various, but not necessarily all, examples of the disclosure there may be provided a receiver apparatus comprising:
  a plurality of downconverters for downconverting separate antenna signals;
  one or more analog to digital converters; and
  one or more multiplexers configurable in at least a first configuration and a second configuration, wherein;
  when the multiplexers are configured in the first configuration the plurality of downconverters and the one or more analog to digital converters are configured to enable separate antenna signals to be combined to provide hybrid beamforming or analog beamforming and when the multiplexers are configured in the second configuration the plurality of downconverters and the one or more analog to digital converters are configured to enable separate antenna signals to be used to enable digital beamforming.

According to various, but not necessarily all, examples of the disclosure there may be provided a transmitter apparatus comprising:
  a plurality of upconverters for upconverting separate signals for different antennas;
  one or more digital to analog converters; and
  one or more demultiplexers configurable in at least a first configuration and a second configuration, wherein;
  when the demultiplexers are configured in the first configuration the plurality of upconverters and the one or more digital to analog converters are configured to enable antenna signals to be combined to provide hybrid beamforming or analog beamforming and when the demultiplexers are configured in the second configuration the plurality of upconverters and the one or more digital to analog converters are configured to enable separate antenna signals to be used to enable digital beamforming.

According to various, but not necessarily all, examples of the disclosure there is provided a receiver apparatus comprising:
  a plurality of downconverting means for downconverting separate antenna signals;
  one or more analog to digital converters; and
  one or more multiplexing means configurable in at least a first configuration and a second configuration, wherein;
  in the first configuration the plurality of downconverting means and the one or more analog to digital converters are configured to enable separate antenna signals to be combined to provide hybrid beamforming or analog beamforming and,
  in the second configuration the plurality of downconverting means and the one or more analog to digital converters are configured to enable separate antenna signals to be used to enable digital beamforming.

According to various, but not necessarily all, examples of the disclosure there may be provided a transmitter apparatus comprising:
  a plurality of upconverting means for upconverting separate signals for different antennas;
  one or more digital to analog converters; and
  one or more demultiplexing means configurable in at least a first configuration and a second configuration, wherein;
  in the first configuration the plurality of upconverting means and the one or more digital to analog converters are configured to enable antenna signals to be combined to provide hybrid beamforming or analog beamforming and,
  in the second configuration the plurality of upconverting means and the one or more digital to analog converters are configured to enable separate antenna signals to be used to enable digital beamforming.

BRIEF DESCRIPTION

Some examples will now be described with reference to the accompanying drawings in which.

DETAILED DESCRIPTION

Examples of the disclosure relate to receiver apparatus and corresponding transmitter apparatus that can be configured in different operational states at different times. In a first operational state hybrid beamforming or analog beamforming can be provided across the bandwidth of the apparatus. In a second operational state the apparatus can be configured to provide digital beamforming across a sub-section of the bandwidth. The receiver apparatus and corresponding transmitter apparatus are dynamic so that they can be switched between the different operational states as appropriate.

Figure 1:
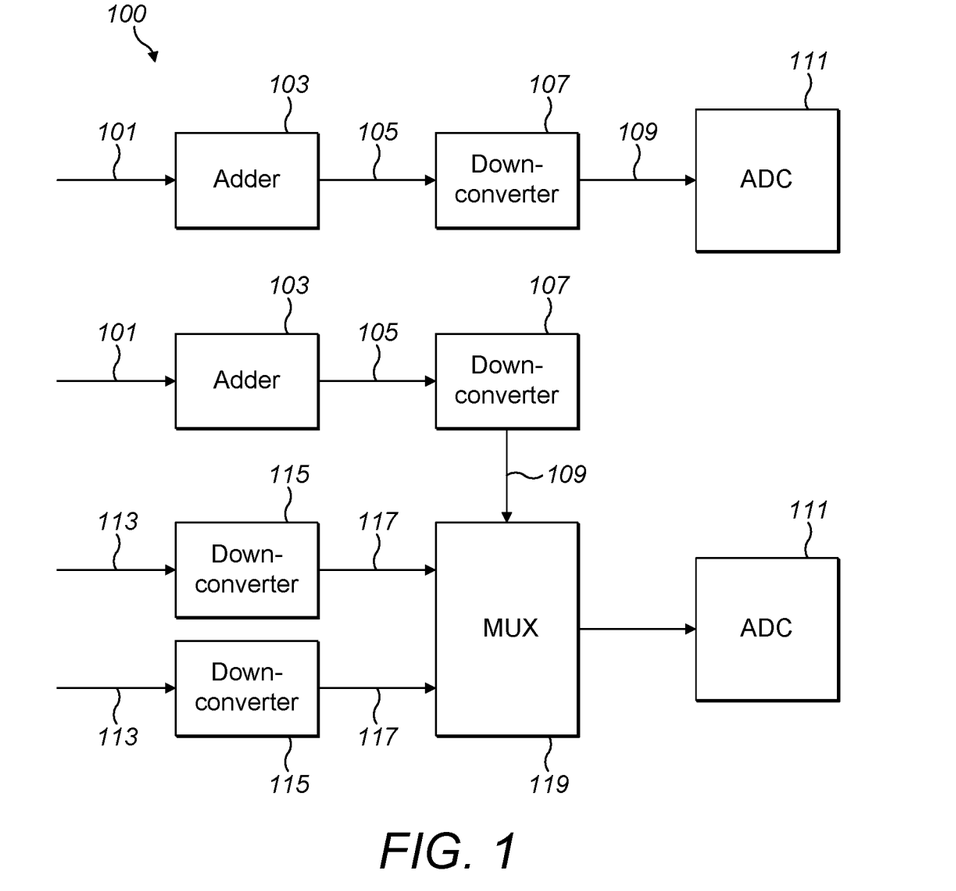
FIG. 1 shows an example receiver apparatus.

FIG. 1 schematically shows a receiver apparatus 100 according to examples of the disclosure. Other arrangements of the components within the receiver apparatus 100 could be used in other examples of the disclosure.

In the example of FIG. 1 the receiver apparatus 100 comprises first downconverters 107, second downconverters 115, one or more ADCs 111 and at least one multiplexing means 119. The receiver apparatus 100 can comprise additional components that are not shown in FIG. 1.

In the example shown in FIG. 1 the receiver apparatus 100 also comprises a plurality of adders 103. the plurality of adders 103 are configured to add a plurality of antenna signals 101. The plurality of antenna signals 101 can comprise a plurality of signals received from a plurality of different antennas. Some processing can be performed on the antenna signals 101 before they are provided to the adder 103. For example, the antenna signals 101 could be phase shifted before they are provided to the adders 103.

The antenna signals 101 can be received from any suitable type of antenna. In some examples the antennas could comprise phased arrays. The phased arrays could comprise a plurality of antenna elements with phase shifters and power combiners/adders and/or any other suitable components.

The adders 103 can comprise any suitable components. The adders 103 can comprise any suitable circuitry or other means that enables the plurality of antenna signals 101 to be added together. The adders 103 receive a plurality of antenna signals 101 as an input and provide an added antenna signal 105 as an output.

In some examples the receiver 100 can comprise components that also enable the antennas signals to be phase shifted and/or amplified. This can enable a combined antenna signals to be provided. The combined antenna signal can comprise an antenna signal that has been added and/or phase shifted and/or amplified and/or had any other suitable process performed on it.

The first downconverters 107 can comprise any means that can be configured to convert a high frequency signal to a low frequency signal. The first downconverters 107 can be configured to convert a high radio frequency signal to a low radio frequency signal. The first downconverters 107 can comprise circuitry or any other suitable means. In some examples the first downconverters 107 can comprise a mixer and local oscillator or any other suitable means.

The first downconverters 107 are configured to receive the added antenna signals 105 as an input and to provide a low frequency signal 109 as an output.

The low frequency signals 109 are provided as inputs to the ADCs 111. The ADCs 111 can comprise any means or circuitry that can be configured to convert the analog low frequency signal 109 to a digital output.

In the example of FIG. 1 the receiver apparatus 100 comprises a plurality of adders 103 and first downconverters 107. This can enable different outputs of the first downconverters 107 to be provided to different ADCs 111. In the schematic example of FIG. 1A a multiplexer 119 is provided between at least one of the first downconverters 107 and an ADC 111.

The receiver apparatus 100 also comprises a plurality of second downconverters 115. The second downconverters 115 can comprise any means that can be configured to convert a high frequency signal to a low frequency signal. The second downconverters 115 can be configured to convert a high radio frequency signal to a low radio frequency signal. The second downconverters 115 can comprise circuitry or any other suitable means. In some examples the second downconverters 115 can comprise a mixer and local oscillator or any other suitable means.

The second downconverters 115 are configured to receive separate antenna signals 113 as an input. The separate antenna signals 113 comprise antenna signals that have not been added together. Different second downconverters 115 can be configured to receive different separate antenna signals 113 as an input.

In the example of FIG. 1 the receiver apparatus 100 comprises a plurality of second downconverters 115. Each of the different second downconverters 115 is associated with a different antenna so that each of the second downconverters 115 receives a different separate antenna signal 113. In some examples, the receiver apparatus 100 can comprise a second downconverter 115 for each of the available antennas so that all of the signals from the antennas can be separately downconverted.

The second downconverters 115 are configured to receive the separate antenna signals 113 as an input and to provide a low frequency signal 117 as an output.

The low frequency signal 117 can be provided as an input to a multiplexer 119. The multiplexer 119 can comprise any suitable multiplexing means. The multiplexer 119 can be configured to enable different signals to be selected. In some examples the multiplexer 119 could comprise a switch.

The multiplexer 119 can be configured in a first configuration in which only downconverted added antenna signals 109 are provided to the ADC 111. In this configuration only the signals from the first downconverters 107 would be provided to the ADC 111 and the signals from the second down converters 115 would not be provided to the ADC 111. When the multiplexer 119 is in this configuration the receiver apparatus 100 provides hybrid beamforming or analog beamforming across the whole bandwidth. The beamforming can be analog beamforming if only one Radio Frequency (RF) chain is used on the full bandwidth. The beamforming can be hybrid beamforming if a plurality of RF chains are used on the full bandwidth. When the multiplexer 119 is in this configuration the second downconverters 115 can be turned off to reduce power consumption.

The multiplexer 119 can also be configured in a second configuration in which one or more of the downconverted separate antenna signals 117 are provided to the ADC 111. In some examples the multiplexer 119 can be configured to enable a plurality of the downconverted separate antenna signals 117 to be sampled and provided to the ADC 111. When the multiplexer 119 is in this configuration the receiver apparatus 100 provides digital beamforming across a sub-section of the bandwidth.

The multiplexer 119 can therefore enable the receiver apparatus 100 to be switched between hybrid beamforming or analog beamforming and digital beamforming. The hybrid beamforming or analog beamforming is provided across a bandwidth of the receiver apparatus and the digital beamforming is provided across a sub-section of the bandwidth. The rank of the digital beamforming can be up to the number of separate antenna signal 113. The digital beamforming can be high rank digital beamforming.

Figure 2:
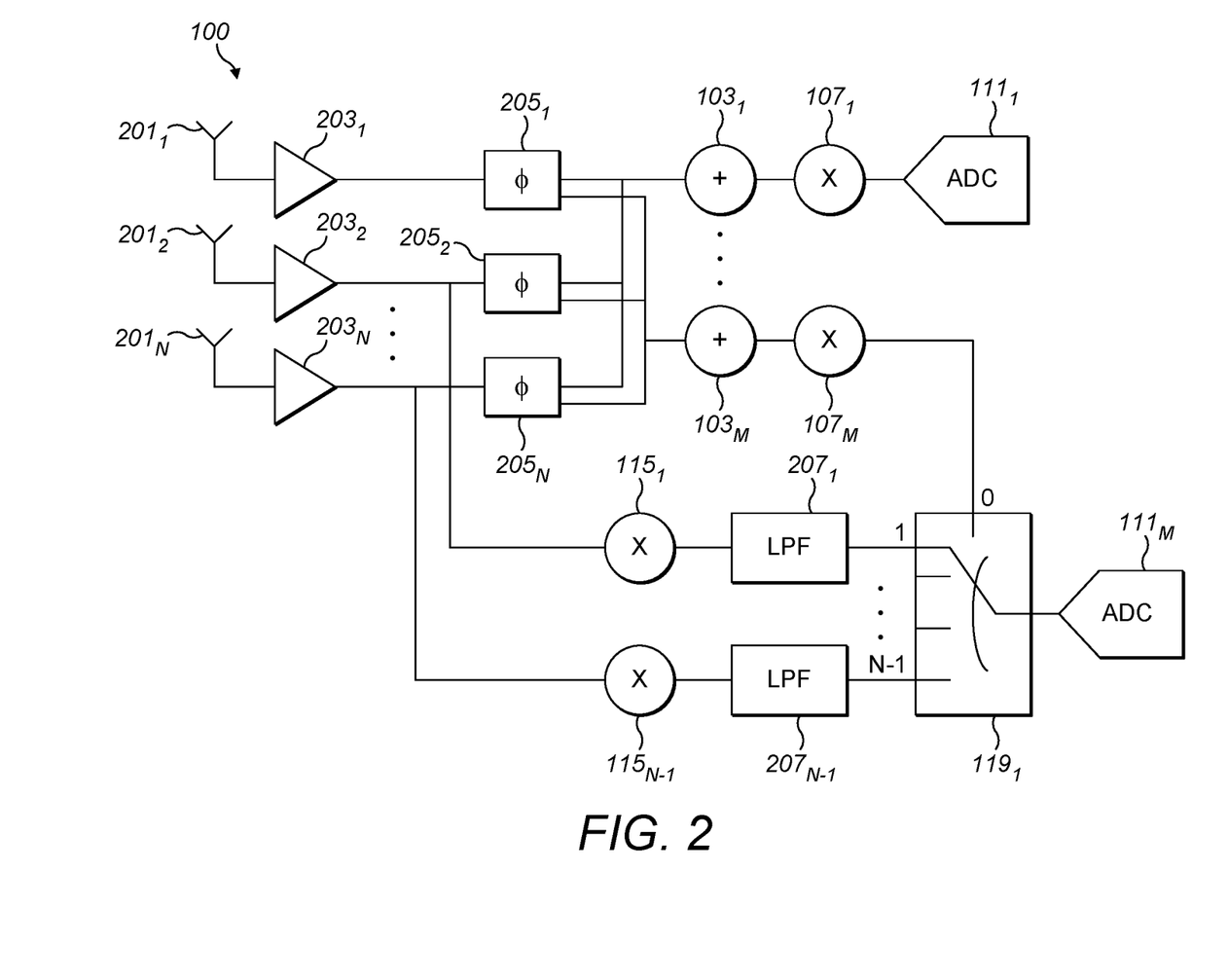
FIG. 2 shows an example receiver apparatus.

FIG. 2 schematically shows an example receiver apparatus 100 in more detail.

The example receiver apparatus 100 comprises a plurality of antennas 201 and a plurality of low noise amplifiers 203. In this example, the receiver apparatus 100 comprises N antennas 201 and N low noise amplifiers 203. N can be any whole number that is equal to or greater than two. In the example of FIG. 1 the number of low noise amplifiers 203 is the same as the number of antennas 201 so that each of the antenna signals from the respective antennas 201 can be amplified separately.

The example apparatus also comprises a plurality of phase shifters 205. The phase shifters can comprise any means or circuitry that can be configured to add a delay into the signals from the antennas 201. In this example the receiver apparatus 100 comprises N phase shifters 205. In the example of FIG. 1 the number of phase shifters 205 is the same as the number of antennas 201 so that each of the antenna signals from the respective antennas 201 can be phase shifted separately. The phase shifters 205 can perform a plurality of phase shifting operations so that the phase shifter provides a plurality of outputs where different outputs have different phases. An example of a phase shifter 205 is shown schematically in FIG. 7.

The receiver apparatus 100 also comprises a plurality of adders 103 and a plurality of first downconverters 107.

In this example the receiver apparatus 100 comprises M adders 103 and M first downconverters 107. The M adders 103 are configured to add the phase shifted antenna signals. The added antenna signals are provided as an input to the first downconverters 107.

The first downconverters 107 can comprise mixers and local oscillators. In the example of FIG. 2 only the mixers are shown for clarity.

The receiver apparatus 100 also comprises M ADCs 111. The ADCs 111 are configured to convert the signals from the first downconverters 107.

A multiplexer 119 is provided between at least one of the first downconverters 107 and an ADC 111.

The receiver apparatus 100 also comprises a plurality of second downconverters 115. In this example the receiver apparatus 100 comprises N−1 second downconverters 115. In other examples the receiver apparatus 100 could comprise any number between 1 and N−1 second downconverters 115. In other examples, other numbers of second downconverters 115 could be used.

The second downconverters 115 can comprise mixers and local oscillators. In the example of FIG. 2 only the mixers are shown for clarity. The local oscillators that are used to provide input signals for the mixers in the second downconverters 115 can be different to the local oscillators that are used to provide the input signals for the mixers in the first downconverters 107. The local oscillators that are used to provide input signals for the mixers in the second downconverters 115 can provide an input signal at a different frequency to the local oscillators that are used to provide the input signals for the mixers in the first downconverters 107.

The second downconverters 115 are configured to receive separate antenna signals as an input. That is, the second downconverters 115 do not receive added antenna signals.

The receiver apparatus 100 also comprises a plurality of low pass filters 207. In this example the receiver apparatus 100 comprises N−1 low pass filters 207. The receiver apparatus 100 comprises the same number of low pass filters 207 as second downconverters 115.

The multiplexer 119 is provided between the second downconverters 115 and the ADC $111_M$. In this example the multiplexer 119 comprises a switch that acts in the time domain. Other types of multiplexers 119, such as but not limited to frequency domain multiplexers, could be used in other examples of the disclosure.

In the example of FIG. 2 only one multiplexer 119 is shown however more than one multiplexer 119 could be provided in other examples of the disclosure.

The multiplexer 119 can be configured into a first configuration so as to cause the receiver apparatus 100 to provide hybrid beamforming across the whole bandwidth. This is shown as configuration 0 in FIG. 2. In this configuration the receiver apparatus 100 provides a hybrid beamforming system with N antennas and rank M.

The multiplexer 119 can also be configured into a second configuration so as to cause the receiver apparatus 100 to provide high rank digital beamforming across a sub-section of the bandwidth. In the second position the multiplexer 119 can be configured to enable one of the K antennas in the subset of all of the N antennas to be sampled for every sample of the $ADC_M$.

In the example of FIG. 2 each of the K antennas 201 in the sub-set of antennas 201 are sampled every K samples of the $ADC_M$ 111. This enables the $ADC_M$ 111 to support 1/K of the bandwidth of the receiver apparatus 100. The section of the bandwidth that is digitalized by this $ADC_M$ 111, will also be digitalized by the M−1 ADCs 111 such as $ADC_1$ 111 in FIG. 2 that performs hybrid beamforming. This therefore enables the receiver apparatus 100 to provide rank K+M−1 digital beamforming when the multiplexer 119 is in the second configuration.

In the example of FIG. 2 only one $ADC_1$ 111 is shown as being used for hybrid beamforming. The number of $ADC_1$s 111 can be M−1. If M is greater than two more than one $ADC_1$ 111 that is used for hybrid beamforming could be provided. This provides a rank M−1 system that be provided on the full bandwidth of the receiver apparatus. The M−1 system can be provided in parallel with the high rank low bandwidth beamforming.

As an example, a receiver apparatus 100 with 300 Mhz bandwidth, N=64 and M=4 would be a rank 4 system without examples of the disclosure. However, the additional second downconverters 115 and the multiplexer 119 can enable the receiver apparatus 100 to be switched to a rank 3 system with a 300 Mhz bandwidth and a rank 16 system with a 23 Mhz bandwidth by setting K=13.

The example of FIG. 2 shows a single radio Frequency (RF) chain for the receiver apparatus 100. Examples of the disclosure could be provided on any number of RF chains within a receiver apparatus 100.

In some examples different local oscillator signals with different frequencies can be used for the second downconverters 115 compared to the first downconverters 107. This can enable the receiver apparatus 100 to be configured to provide a rank K+M−1 beamforming on any part of the hybrid system bandwidth, or a rank K beamforming outside that bandwidth.

The multiplexing of the $ADC_M$ 111 can be done in the time domain or in the frequency domain. To enable the multiplexing to be done in the frequency domain each of the mixers in the second downconverters 115 can use a different frequency for the local oscillator. In such examples a band pass filter could be use instead of a low pass filter. Once the signals have been converted by the $ADC_M$ 111 the signals from each antenna 201 can be filtered and further downconverted in the digital domain. The further downconversion can bring all of the antenna signals to the same baseband frequency. In such examples the different local oscillators for the different down converters can be generated by phase locked loops from the same base lock. This can provide a predictable phase shift between the different local oscillators. The receiver apparatus 100 can be configured so that different phase shifts can be compensated for in the digital domain.

Figure 3:
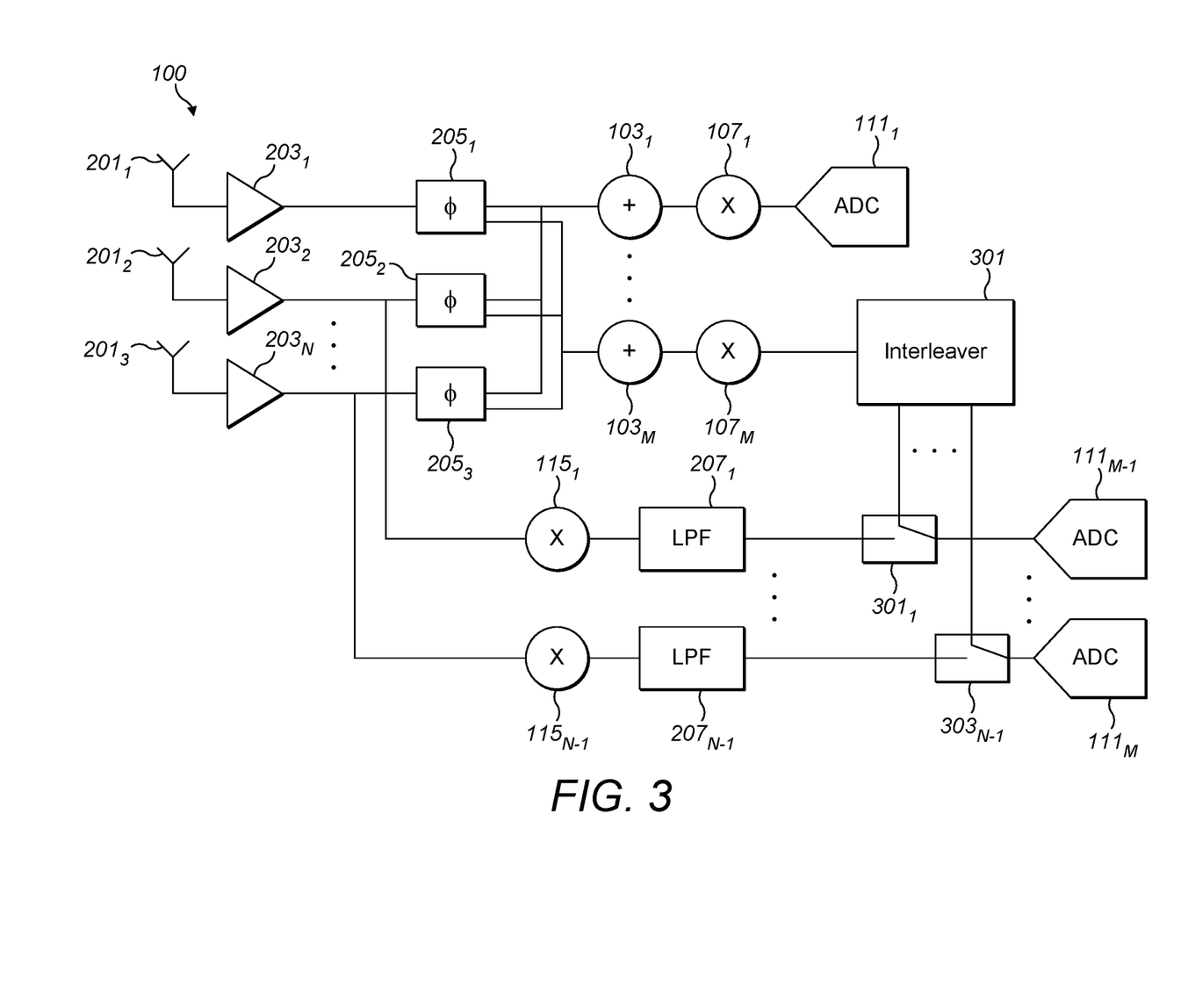
FIG. 3 shows an example receiver apparatus.

FIG. 3 schematically shows another example receiver apparatus 100. The example receiver apparatus 100 of FIG. 3 comprises a plurality of antennas 201, a plurality of low noise amplifiers 203, a plurality of phase shifters 205 a plurality of adders 103, a plurality of first downconverters 107, a plurality of second downconverters 115, low pass filters 207 and a plurality of ADCs 111. These components can be arranged similar to the receiver apparatus 100 of FIG. 2. Corresponding reference numerals are used for corresponding features. The receiver apparatus 100 can comprise additional components that are not shown in FIG. 3.

The example receiver apparatus 100 of FIG. 3 also comprises at least one multiplexing means 119. In this example the multiplexing means 119 comprises an interleaver 301 and a plurality of switches 303.

In this example a switch 303 is provided for an output of each of the second downconverters 115 and low pass filters 207. In this example N−1 switches 303 are provided. Other numbers of switches 303 could be provided in other examples.

The switches 303 are provided between the second downconverters 115 and the ADCs 111. In the example of FIG. 3 the switches 303 are provided between low pass filters 207 and the ADCs 111.

The interleaver 301 is configured to receive an input from one of the plurality of the first downconverters 107. The interleaver 301 can be configured to enable interleaving in the frequency domain or in the time domain. The interleaver can be configured to enable interleaving of the downconverted separate antenna signals.

The interleaver 301 can comprise any means that takes an input signal with a wide frequency content and splits it into a plurality of narrower signals. The narrower signals can be digitized by a suitable ADC 111. The wideband signal can then be reconstructed in the digital domain.

When the switches 303 are in a first configuration, as shown in FIG. 3, the output of the interleaver 301 is provided to the plurality of ADCs $111_{M-1}$-$111_M$. This allows the plurality of ADCs $111_{M-1}$-$111_M$ to be combined. This causes the receiver apparatus 100 to provide hybrid beamforming across the whole bandwidth of the receiver apparatus 100. In this configuration the receiver apparatus 100 provides a hybrid beamforming system with N antennas and rank M.

When the switches 303 are in a second configuration the outputs from the second downconverters 115 and low pass filters 207 are provided to the plurality of ADCs $111_{M-1}$-$111_M$. This causes the receiver apparatus 100 to provide high rank digital beamforming across a sub-section of the bandwidth.

The interleaver 301 and plurality of switches 303 can therefore enable the receiver apparatus 100 to be switched between hybrid beamforming or analog beamforming and digital beamforming.

Figure 4:
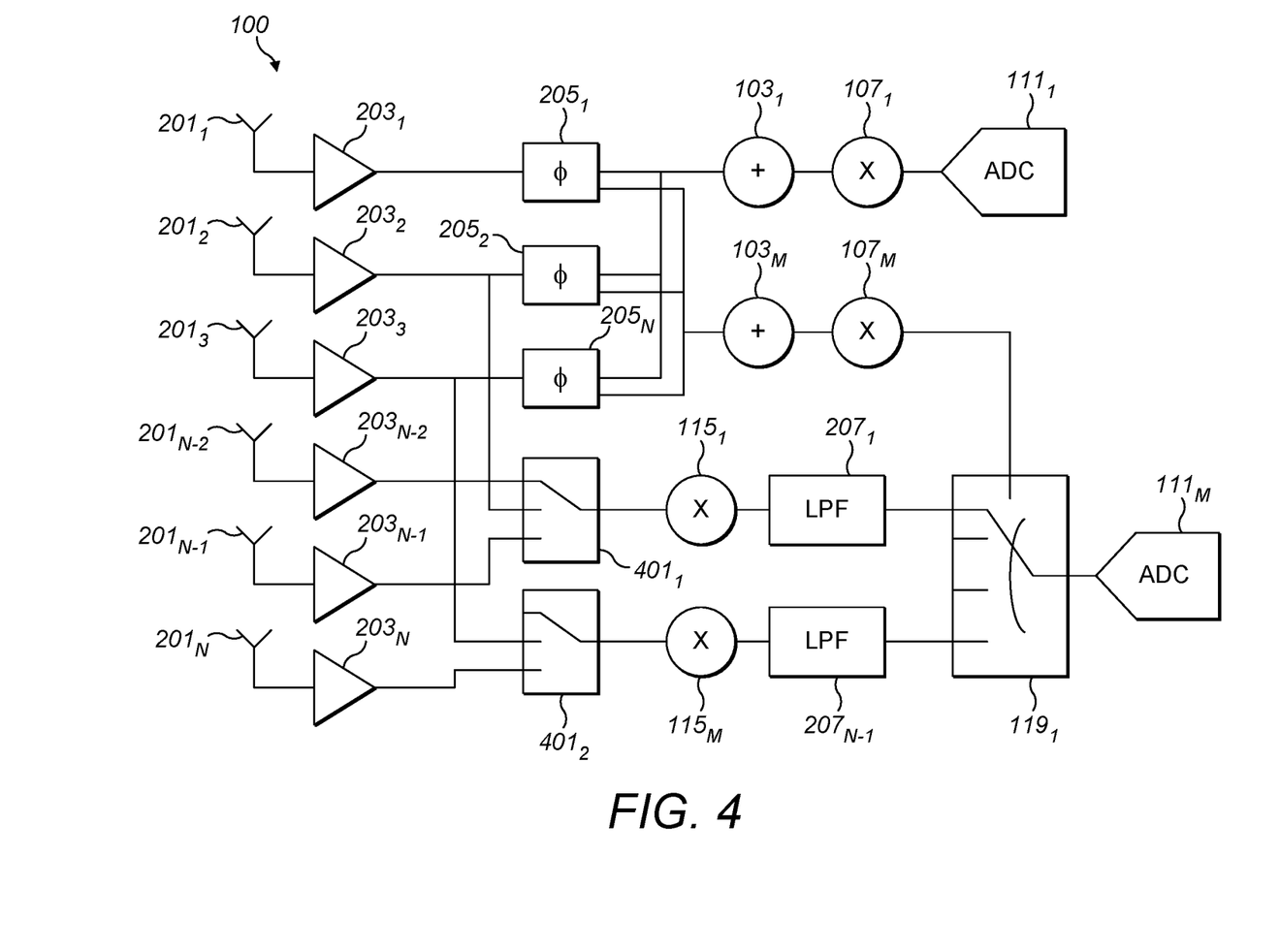
FIG. 4 shows an example receiver apparatus.

FIG. 4 schematically shows another example receiver apparatus 100. The example receiver apparatus 100 of FIG. 4 is similar to the receiver apparatus 100 of FIG. 2. Corresponding reference numerals are used for corresponding features. However, in the example of FIG. 4 the receiver apparatus 100 comprises a plurality of additional multiplexers 401.

The additional multiplexers 401 are provided between the low noise amplifiers 203 and the second downconverters 115. The additional multiplexers 401 can comprise switches or any suitable type of multiplexing means.

The additional multiplexers 401 can be configured to enable the separate antenna signals to multiplex the signals from a plurality of different antennas 201. This enables the input for the ADC 111 to be switched between antenna signals.

The additional multiplexers 401 can reduce the number of second downconverters 115 that are needed. This can reduce the number of second downconverters 115 within the receiver apparatus 100. This reduces the power needed by local oscillators used within second downconverters 115.

In the example of FIG. 4 the additional multiplexers 401 can comprise fast radio frequency switches and the mixers within the second downconverters 115 can be configured to settle in a time that is shorter than several samples of the ADC 111.

Figure 5:
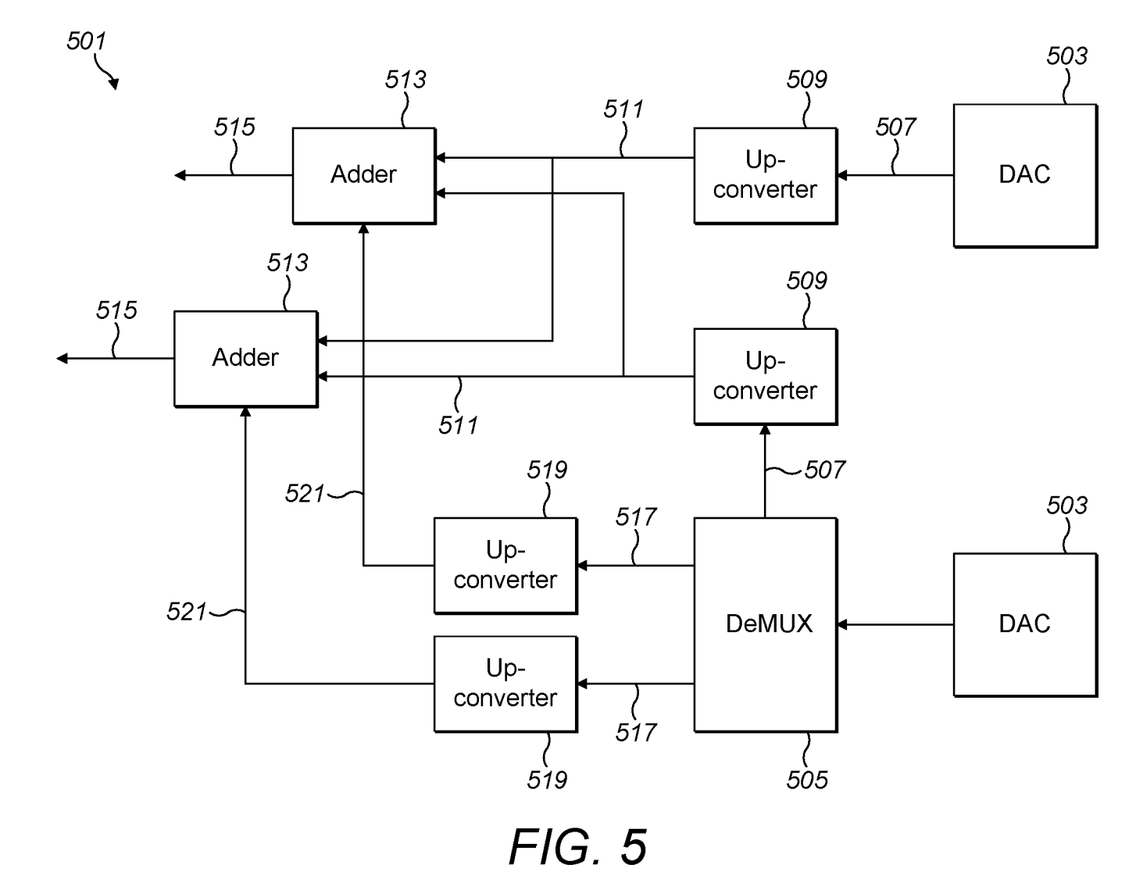
FIG. 5 shows an example transmitter apparatus.

FIG. 5 schematically shows an example transmitter apparatus 501. The transmitter apparatus 501 is a corresponding apparatus to the receiver apparatus 100 of FIGS. 1 to 4.

In the example of FIG. 5 the transmitter apparatus 501 comprises first upconverters 509, second upconverters 519, one or more DACs 503 and at least one demultiplexing means 505. The transmitter apparatus 501 can comprise additional components that are not shown in FIG. 5. For example, the transmitter apparatus 501 could comprise phase shifters or other suitable components. The phase shifters could be provided before the adders 513 in the example of FIG. 5.

The DACs 503 can comprise any means of circuitry that can be configured to convert a digital input signal to an analog output signal 507. The transmitter apparatus 501 can comprise any suitable number of DACs 503.

The transmitter apparatus 501 is configured so that output signals of the DACs 503 can be provided to the first upconverters 509. The first upconverters 509 can comprise any means that can be configured to convert a low frequency signal to a high frequency signal. The first upconverters 509 can be configured to convert a low radio frequency signal to a high radio frequency signal. The first upconverters 509 can comprise circuitry or any other suitable means. In some examples the first upconverters 509 can comprise a mixer and local oscillator or any other suitable means.

The first upconverters 509 are configured to receive the analog output signal 507 from the DACs 503 and provide the upconverted signal 511 as an output.

In the example shown in FIG. 5 the transmitter apparatus 501 also comprises a plurality of adders 513. The plurality of adders 513 are configured to add a plurality of signals from the first upconverters 509 and the second upconverter 519. The added signals can then be provided to a plurality of antennas for transmission. The adders 513 can comprise any suitable circuitry or other means that enables the plurality of antenna signals 511 to be added together.

The transmitter apparatus 501 also comprises a plurality of second upconverters 519. The second upconverters 519 can comprise any means that can be configured to convert a low frequency signal to a high frequency signal. The second upconverters 519 can be configured to convert a low radio frequency signal to a high radio frequency signal. The second upconverters 519 can comprise circuitry or any other suitable means. In some examples the second upconverters 519 can comprise a mixer and local oscillator or any other suitable means.

The second upconverters 519 are coupled to the demultiplexer 505 so that the outputs from a DAC 503 can be sampled and provided to the second upconverters 519. The outputs from the second upconverters can also be provided to the adders 513. Each of the outputs from the second upconverters 519 are provided to a single adder 513 so that signals 521 from the second upconverters 519 are only provided to a single antenna within the transmitter apparatus 501.

The transmitter apparatus 501 is configured so that the outputs 515 from the adders 513 are provided to a plurality of antennas for transmission. The transmitter apparatus 501 comprises a plurality of adders 513 and antennas so that the output from each of the adders 513 is provided to a single antenna.

The transmitter apparatus 501 can therefore be configured in two different configurations. When the demultiplexer 505 is configured in the first configuration the transmitter apparatus 501 is configured so that the second upconverters 519 are not used. In this configuration the second upconverters can be turned off to reduce power consumption. In this configuration the signals from the DACs 503 are combined to provide hybrid beamforming or analog beamforming. The beamforming can be analog beamforming if only one RF chain is used on the full bandwidth. The beamforming can be hybrid beamforming if a plurality of RF chains are used on the full bandwidth.

When the demultiplexer 505 is configured in the second configuration the transmitter apparatus 501 is configured so that the second upconverters 519 are used. In this configuration the signals from the DACs 503 are provided as separate signals to the antennas to enable digital beamforming. The hybrid beamforming or analog beamforming is provided across a bandwidth of the transmitter apparatus 501 and the digital beamforming is provided across a sub-section of the bandwidth.

Figure 6:
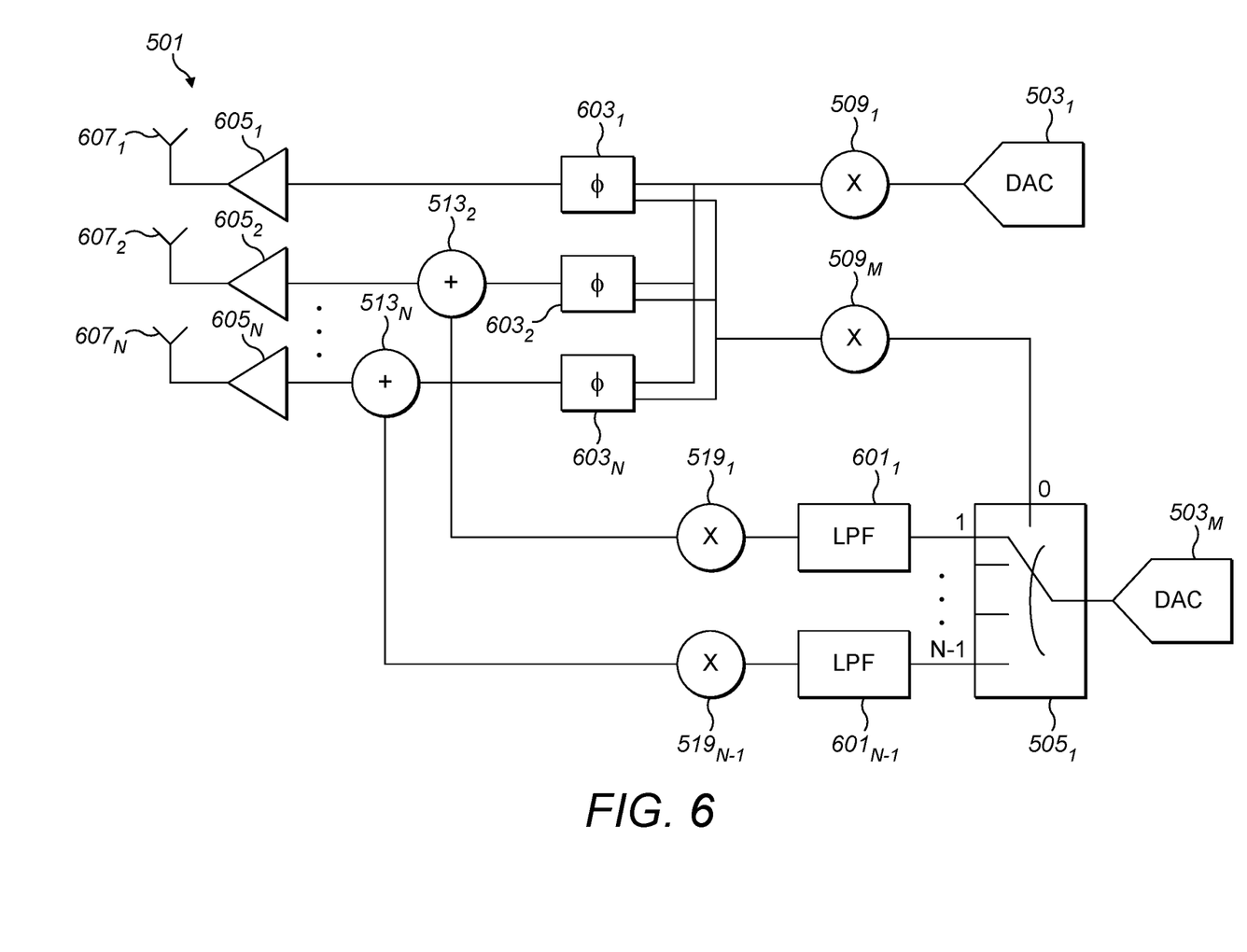
FIG. 6 shows an example transmitter apparatus.

FIG. 6 shows an example transmitter apparatus 501 in more detail.

The transmitter apparatus 501 comprises M DACs 503. The DACs 503 are configured to provide analog output signals for the upconverters 509, 519.

A demultiplexer 505 is provided between at least one of the DACs 513 and the upconverters 509, 519. The demultiplexer 505 can comprise one or more switches or any other suitable means.

When the demultiplexer 505 is configured in a first configuration the outputs from the DAC 503 are provided to the first upconverters 509 to enable the transmitter apparatus 501 to provide hybrid beamforming or analog beamforming. In this example the transmitter apparatus 501 comprises M first upconverters 509. The transmitter apparatus 501 comprises the same number of first upconverters 509 as DACs 503.

The transmitter apparatus 501 also comprises a plurality of antennas 607 and a plurality of power amplifiers 605 and a plurality of phase shifters 603. In this example the transmitter apparatus 501 comprises N antennas 607, N power amplifiers 605 and N phase shifters 603. The output signals from the first upconverters 509 are provided to the plurality of phase shifters 603 and the phase shifted signals are then provided to the power amplifiers 605 before being transmitted by the antennas 607. The phase shifters 603 can be configured to add a phase shift to the plurality of input signals and then combine the phase shifted signals into a single output. The phase shifters 603 could be corresponding phase shifters to the example shown in FIG. 7.

When the demultiplexer 505 is configured in a second configuration the outputs from the DAC 503 are provided to the second upconverters 519 to enable the transmitter apparatus 501 to provide high rank digital beamforming. In this example the transmitter apparatus 501 comprises N−1 second upconverters 519.

In the example of FIG. 6 the transmitter apparatus 501 a comprises a plurality of low pass filters 601. In this example the transmitter apparatus 501 comprises N−1 low pass filters 601. The low pass filters 601 are configured to filter the analog signals before they are provided to the second upconverters 519.

The outputs from the second upconverters 519 are each provided to a single antenna 607. The outputs are combined with signals from the first upconverters 509 using the plurality of adders 513. In this example N−1 adders 513 are provided. Other numbers of adders 513 could be used in other examples of the disclosure.

Figure 7:
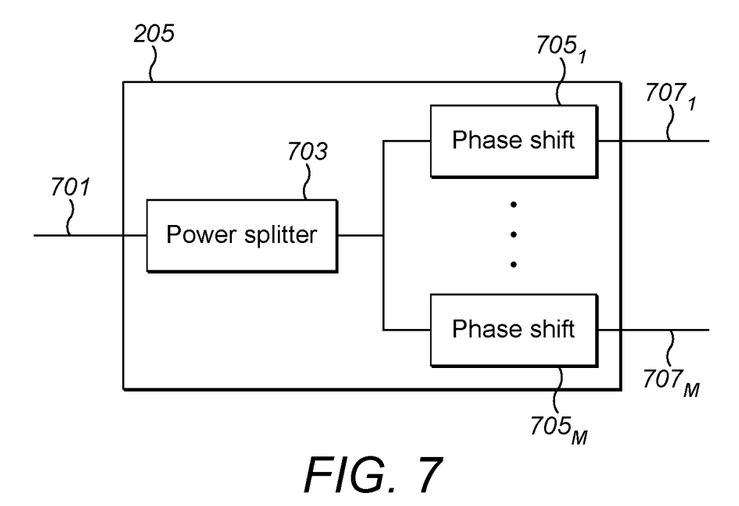
FIG. 7 shows an example phase shifter.

FIG. 7 schematically shows an example phase shifter 205 that could be used in some receiver apparatus 101 in examples of the disclosure.

The phase shifter 205 comprises a power splitter 703 and a plurality of phase shift modules 705.

The phase shifter 205 receives a single input signal 701. The input signal 701 is provided to the power splitter 703. The power splitter 703 is configured to split the input signal 701 into a plurality of signals. In this example the power splitter 703 is configured to split the input signal 701 into M signals.

The phase shifter 205 comprises M phase shift modules 705. Each of the phase shift modules receives an input signal from the power splitter 703. The phase shift modules 705 are configured to add a phase shift the signals from the power splitter 703.

Each of the phase shift modules 705 provide an output signal 707 so that the phase shifter 205 provides M output signals. Different output signals have different phase shifts.

The example phase shifter 205 shown in FIG. 7 is configured for use in a receiver apparatus 100. It is to be appreciated that corresponding phase shifters could also be used in transmitter apparatus 501. In such cases the phase shifter would comprise a power combiner instead of a power splitter. The phase shifters in the transmitter apparatus 501 would be configured to receive a plurality of input signals having different phases and then add a different phase different to each of the input signals before combining the signals to provide a single output.

Other configurations for the phase shifters 205, 603 could be used in other examples.

Variations to the receiver apparatus 100 and transmitter apparatus 501 could be used in other examples of the disclosure. For instance, in some example receiver apparatus 100 the multiplexing means 119 could be combined with one or more ADCs 111. This can enable the multiplexing means 119 and an ADC 111 to be provided in a single logical block. For instance, an interleaved ADC could be used Examples of the disclosure therefore provide the advantage that the receiver apparatus 100 or transmitter apparatus 501 can be switched between an operational state in which hybrid beamforming or analog beamforming can be provided across the bandwidth of the apparatus and an operational state in which the apparatus can be configured to provide digital beamforming across a sub-section of the bandwidth. The digital beamforming can be high rank digital beamforming. This can enable the high rank digital beamforming to be used when required but also reduces the number of expensive components and/or components that use a lot of power.

In this description the term coupled means operationally coupled. Any number or combination of intervening elements can exist between coupled components including no intervening elements.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A receiver apparatus comprising:
a plurality of downconverters configured to downconvert separate antenna signals;
one or more analog to digital converters; and
one or more multiplexers configurable in at least a first configuration and a second configuration, wherein;
when the one or more multiplexers are configured in the first configuration, the plurality of downconverters and the one or more analog to digital converters are configured to enable the separate antenna signals to be combined to provide hybrid beamforming or analog beamforming and when the one or more multiplexers are configured in the second configuration, the plurality of downconverters and the one or more analog to digital converters are configured to enable the separate antenna signals to be used to enable digital beamforming.

2. The receiver apparatus as claimed in claim 1 wherein the hybrid beamforming or analog beamforming is enabled across a bandwidth of the receiver apparatus and the digital beamforming is enabled across a sub-section of the bandwidth.

3. The receiver apparatus as claimed in claim 1 further comprising:
one or more downconverters configured to downconvert combined antenna signals and wherein when the multiplexers are configured in the first configuration, only downconverted combined antenna signals are provided to the one or more analog to digital converters and when the multiplexers are configured in the second configuration, at least a sub-set of the downconverted separate antenna signals are sampled and provided to the one or more analog to digital converters.

4. The receiver apparatus as claimed in claim 1 further comprising a plurality of analog to digital converters configured to convert the downconverted separate antenna signals such that when the one or more multiplexers are in the first configuration outputs of the plurality of analog to digital converters are combined to provide hybrid beamforming or analog beamforming and when the one or more multiplexers are in the second configuration the downconverted separate antenna signals are used to provide digital beamforming.

5. The receiver apparatus as claimed in claim 4 wherein the one or more multiplexers are configured to use at least one of time interleaving, frequency interleaving.

6. The receiver apparatus as claimed in claim 1 wherein the one or more multiplexers and the one or more analog to digital converters are configured to enable the analog beamforming to be provided in parallel with the digital beamforming.

7. The receiver apparatus as claimed in claim 1 wherein the one or more multiplexers are configured to enable a rank of the digital beamforming to be varied.

8. The receiver apparatus as claimed in claim 1 wherein the one of more multiplexers are configured to control a rank of digital beamforming by controlling a number of separate antenna signals that are sampled.

9. The receiver apparatus as claimed in claim 1 further comprising one or more additional multiplexers configured to multiplex the separate antenna signals before they are provided to the plurality of downconverters for downconverting the separate antenna signals.

10. The receiver apparatus as claimed in claim 1 wherein the one or more multiplexers comprise one or more switches.

11. The receiver apparatus as claimed in claim 1 wherein the plurality of downconverters comprise one or more mixers.

12. A transmitter apparatus comprising:
a plurality of upconverters configured to upconvert separate signals for different antennas;
one or more digital to analog converters; and
one or more demultiplexers configurable in at least a first configuration and a second configuration, wherein;
when the one or more demultiplexers are configured in the first configuration, the plurality of upconverters and the one or more digital to analog converters are configured to enable antenna signals to be combined to provide hybrid beamforming or analog beamforming and when the one or more demultiplexers are configured in the second configuration, the plurality of upconverters and the one or more digital to analog converters are configured to enable separate antenna signals to be used to enable digital beamforming.

13. The transmitter apparatus as claimed in claim 12 wherein the hybrid beamforming or analog beamforming is provided across a bandwidth of the transmitter apparatus and the digital beamforming is provided across a sub-section of the bandwidth.

14. The transmitter apparatus as claimed in claim 12 further comprising one or more upconverters configured to upconvert signals for a plurality of antennas and wherein when the one or more demultiplexers are configured in the first configuration, only the signals from the one or more digital to analog converters are provided to the plurality of upconverters configured to upconvert signals for the plurality of antennas and when the demultiplexers are configured in the second configuration, at least a sub-sample of the signals from the one or more digital to analog converters are provided to the plurality of upconverters configured to upconvert the separate signals for different antennas.

15. The transmitter apparatus as claimed in claim 12 wherein the one or more demultiplexers and the one or more analog to digital converters are configured to enable the hybrid beamforming or analog beamforming to be provided in parallel with the digital beamforming.

16. The transmitter apparatus as claimed in claim 12 wherein the one or more demultiplexers are configured to enable a rank of the digital beamforming to be varied.

17. The transmitter apparatus as claimed in claim 12 wherein the one or more demultiplexers are configured to control a rank of digital beamforming by controlling the sampling rate of the signals provided to the one or more demultiplexers.

18. Then electronic device comprising at least one transmitter apparatus according to claim 12 and/or at least one receiver apparatus comprising:
a plurality of downconverters configured to downconvert the separate antenna signals;
one or more analog to digital converters; and
one or more multiplexers configurable in at least a first multiplexer configuration and a second multiplexer configuration, wherein;
when the one or more multiplexers are configured in the first multiplexer configuration, the plurality of downconverters and the one or more analog to digital converters are configured to enable separate antenna signals to be combined to provide hybrid beamforming or analog beamforming and when the one or more multiplexers are configured in the second multiplexer configuration, the plurality of downconverters and the one or more analog to digital converters are configured to enable the separate antenna signals to be used to enable digital beamforming.

19. The transmitter apparatus as claimed in claim 14 wherein the one or more demultiplexers comprise one or more switches.

20. The transmitter apparatus as claimed in claim 14 wherein at least one of the plurality of upconverters and the one or more upconverters comprise one or more mixers.

* * * * *